(12) United States Patent
Inoue

(10) Patent No.: US 8,600,215 B2
(45) Date of Patent: Dec. 3, 2013

(54) ELECTRONIC DEVICE, PLAYBACK DEVICE AND SERVER DEVICE

(75) Inventor: Takeshi Inoue, Osaka (JP)

(73) Assignee: Funai Electric Co., Ltd., Daito-shi, Osaka (JP)

( * ) Notice: Subject to any disclaimer, the term of this patent is extended or adjusted under 35 U.S.C. 154(b) by 0 days.

(21) Appl. No.: 13/448,412

(22) Filed: Apr. 17, 2012

(65) Prior Publication Data

US 2013/0101267 A1 Apr. 25, 2013

(30) Foreign Application Priority Data

Apr. 20, 2011 (JP) ................................. 2011-094030
Apr. 20, 2011 (JP) ................................. 2011-094031

(51) Int. Cl.
*H04N 9/80* (2006.01)

(52) U.S. Cl.
USPC ................ 386/241; 386/239; 386/248; 725/9

(58) Field of Classification Search
USPC .................. 386/239–248, 261–262, 291–299
See application file for complete search history.

(56) References Cited

U.S. PATENT DOCUMENTS

| 8,009,232 B2 * | 8/2011 | Murabayashi ................ 348/558 |
| 2003/0093790 A1 * | 5/2003 | Logan et al. .................... 725/38 |
| 2010/0192173 A1 * | 7/2010 | Mizuki et al. ................... 725/25 |
| 2010/0202763 A1 * | 8/2010 | Ukawa et al. ................. 386/124 |
| 2011/0004624 A1 * | 1/2011 | Bansal et al. ................. 707/776 |

FOREIGN PATENT DOCUMENTS

| JP | 2002-245259 A | 8/2002 |
| JP | 2007-060305 A | 3/2007 |
| JP | 2007-264789 A | 10/2007 |
| JP | 2008-182674 A | 8/2008 |
| JP | 2008-263502 A | 10/2008 |
| JP | 2008-278088 A | 11/2008 |
| JP | 2009-081575 A | 4/2009 |
| WO | 2007/126096 A | 11/2007 |
| WO | 2007/126097 A | 11/2007 |

* cited by examiner

*Primary Examiner* — Hung Dang
(74) *Attorney, Agent, or Firm* — Yokoi & Co., U.S.A., Inc.; Toshiyuki Yokoi

(57) ABSTRACT

The present invention discloses an electronic device having a recording section that records a content extracted from broadcasting, an acquiring section that acquires information related to the content from a network, and a chapter making section that specifies chapters to the content recorded in the recording section based on hourly fluctuation of a number of the information related to the content and associates the chapter with a classification of the information during the period of the chapter.

15 Claims, 26 Drawing Sheets

Fig. 4

| ID | number of letters | sum of letter values | emotional expression | classification of the emotion |
|---|---|---|---|---|
| 012345678910 | 5 | xxxx | Great | GREAT! |
| 012345678911 | 5 | xxxy | Happy | HAPPY! |
| ⋮ | ⋮ | ⋮ | ⋮ | ⋮ |
| ⋮ | ⋮ | ⋮ | ⋮ | ⋮ |

Fig. 5 ta no shi i
↓  ↓  ↓  ↓
30 44 21 01 = 96   ← sum of letter values letter value

|    | 00  | 01  | 02  | 03  | 04  |
|----|-----|-----|-----|-----|-----|
| 00 | a   | i   | u   | e   | o   |
| 10 | ka  | ki  | ku  | ke  | ko  |
| 20 | sa  | shi | su  | se  | so  |
| 30 | ta  | chi | tsu | te  | to  |
| 40 | na  | ni  | nu  | ne  | no  |
| 50 | ha  | hi  | fu  | he  | ho  |
| 60 | ma  | mi  | mu  | me  | mo  |
| 70 | ya  | --  | yu  | --  | yo  |
| 80 | ra  | ri  | ru  | re  | ro  |
| 90 | wa  | --  | --  | --  | wo  |
| ⋮  | ⋮   | ⋮   | ⋮   | ⋮   | ⋮   |

Fig. 7

| contribution ID | program ID | posted time of the contribution | contributor | content of the contribution | classification of the emotion |
|---|---|---|---|---|---|
| 00000001 | #ASDFGHJK | 2010/01/01/00:07:18:32 | SNUser1 | Hello world! I'm fine! | FUN |
| 00000002 | #ASDFGHJK | 2010/01/01/00:07:18:50 | SNUser2 | Wow! | SURPRISE |
| 00000003 | #ASDFGHJK | 2010/01/01/00:07:18:32 | SNUser3 | ;) | FUN |

Fig. 14

| | Broadcast station 1 | Broadcast station 2 | Broadcast station 3 | Broadcast station 4 |
|---|---|---|---|---|
| 0:00:00 | | | | |
| 1:00:00 | 😊 | | | |
| 2:00:00 | | 😔 | | |
| 3:00:00 | | | | |
| 4:00:00 | | | | |
| 5:00:00 | | | | |
| 6:00:00 | | | | |
| 7:00:00 | | | | |
| 8:00:00 | | | | |
| 9:00:00 | | | | 😣 |
| 10:00:00 | | | | |
| 11:00:00 | | | | |
| 12:00:00 | | | 😣 | |
| 13:00:00 | | | | |
| 14:00:00 | | | | |
| 15:00:00 | | | | |
| 16:00:00 | | | | |
| 17:00:00 | | | | |
| 18:00:00 | | | 😊 | |
| 19:00:00 | | | | |
| 20:00:00 | | | | |
| 21:00:00 | | | | 😊 |
| 22:00:00 | | | | |
| 23:00:00 | | | | |
| 24:00:00 | | | | |

March 15, 2011(Tue)

Fig. 16
| chapter number | chapter thumbnail | reaction of user (emotional expression) | contribution data | beginning time | end time |
|---|---|---|---|---|---|
| 1 | | Great |  xxxxxxxxx | 00:00:00 | 00:11:21 |
| 2 | | Happy |  xxxxxxxxx | 00:11:22 | 00:25:30 |
| 3 | | Scary |  xxxxxxxxx | 00:25:30 | 00:30:00 |
| ⋮ | ⋮ | ⋮ | ⋮ | ⋮ | ⋮ |
program title

Fig. 23

| registration ID | user name | service name | weight for category (sports) | | weight for category (news) | | weight for category (dramas) | | weight for category (comedies) | |
|---|---|---|---|---|---|---|---|---|---|---|
| | | | for climax time | for emotional expressions | for climax time | for emotional expressions | for climax time | for emotional expressions | for climax time | for emotional expressions |
| 00000001 | SNS user1 | Twitter | 1.2 | 2 | 1 | 1 | 1.2 | 1.8 | 2 | 1.2 |
| 00000002 | SNS user2 | Facebook | 1.1 | 1.5 | 1 | 1 | 1.3 | 1.4 | 1.2 | 1.7 |
| 00000003 | SNS user3 | Twitter | 1.3 | 1.3 | 1 | 1 | 1 | 1 | 1 | 1 |
| ... | ... | ... | ... | ... | ... | ... | ... | ... | ... | ... |

ELECTRONIC DEVICE, PLAYBACK DEVICE AND SERVER DEVICE

CROSS-REFERENCES TO RELATED APPLICATIONS

The entire disclosure of Japanese Patent Application No. 2011-094030, filed Apr. 20, 2011 and Japanese Patent Application No. 2011-094031, filed Apr. 20, 2011, are expressly incorporated by reference herein.

BACKGROUND OF THE INVENTION

1. Field of the Invention

This invention relates to an electronic device, a playback device and a server device, especially concerning an electronic device recording movies on recording media, a playback device playing movies, and a server device transferring the recorded movies.

2. Description of the Related Art

Recently, because of larger capacity of recording media, many users record images for long hours and watch long hours of images. In addition, because of improvement of recording technologies and communications technologies, many users record plural images and select an image to watch from the plural images. In other words, users have to search a desired position from the long hours of the image when watching the image, or have to search a desired image from the plural images and then search a desired position from the searched image. Chapter information is one of the information used for such a search.

When dividing chapters, an automatic division or a manual division can be applied as a dividing method.

In the automatic division, images are extracted periodically and a matching score is calculated between each extracted image and the previous or next image. If the matching score is low or almost mismatched, a scene is determined to be changed and a new chapter is allocated. However, when dividing chapters automatically, chapters cannot always be divided appropriately because the division of the chapters is determined only by elapsed time of a program or thumbnails of the extracted images.

On the other hand, in the manual division, chapters can be divided appropriately but users have to specify positions to divide the chapters. In other words, users have to watch the program once in order to find where to divide chapters.

Following technologies are known as related arts of the present invention.

Patent document 1: Japanese Patent Application Publication No. 2009-081575
Patent document 2: Japanese Patent Application Publication No. 2008-263502
Patent document 3: Japanese Patent Application Publication No. 2008-182674
Patent document 4: Japanese Patent Application Publication No. 2007-060305
Patent document 5: Japanese Patent Application Publication No. 2002-245259
Patent document 6: Patent Cooperation Treaty application Publication No. 2007/126097
Patent document 7: Patent Cooperation Treaty application Publication No. 2007/126096
Patent document 8: Japanese Patent Application Publication No. 2008-278088
Patent document 9: Japanese Patent Application Publication No. 2007-264789

Technologies for searching a desired scene from an image are disclosed in patent documents 1, 2, 6, 7, 8 and 9.

According to the technology disclosed in patent document 1, by adding metadata associated with plural information to movie frame numbers, thumbnails of the associated scene are dynamically generated based on a searching of a user, and the user can select the desired scene by referring to the thumbnails.

According to the technology disclosed in patent document 2, a system to share the scene of a program introduced in message boards or the like between an introducer and readers can be provided.

According to the technology disclosed in patent documents 6 and 7, a characteristic parameter to show the characteristic of video/audio data and an accompaniment parameter to link to the video/audio data are acquired together with the video data, then a display space is generated with the characteristic parameter and the accompaniment parameter are taken as coordinate axes, and then each video data is displayed on the display space based on the parameters.

According to the technology for specifying a scene to extract disclosed in patent document 8, plural comment information related to each content are divided into plural words by using a morphological analysis, then an evaluation value of each word is calculated based on an accumulated appearance frequency of each word, and then the beginning time and the end time of the scene are extracted based on a distribution shape of the evaluation value concerning the word in the content.

According to the technology for properly displaying comments added on a movie content disclosed in patent document 9, evaluations or comments of each scene of the movie content added by users are displayed on a time-line as a marker indicating a frequency of comments and tendency of the content.

In addition, patent documents 3-5 are disclosed to improve the watching environment in connection with the internet that has grown remarkably recent years.

According to the technology disclosed in patent document 3, by dynamically accessing a server on a network when watching temporally services such as broadcastings or DVDs, flexible expressions can be obtained and interactivity can be achieved.

According to the technology disclosed in patent document 4, by monitoring the numbers of messages written on message board servers corresponding to a broadcast station or a broadcasting program, evaluations of other people about the currently broadcasted program can be provided to viewers.

According to the technology disclosed in patent document 5, by making a personal space for each user with a security key in a server connecting via the internet and instructing from a mobile device to a television tuner connected to the server, television programs can be recorded in the personal space for each user by using data compression technologies.

As explained above, the environment to divide chapters of recorded images are not enough for end users, and a technology to divide chapters effectively is desired.

The present invention provides an electric device, a playback device and server device which can allocate chapters effectively.

BRIEF SUMMARY OF THE INVENTION

One aspect of the present invention provides an electronic device having a recording section that records a content extracted from broadcasting, comprising:

an acquiring section that acquires information related to the content from a network, a classification section that analyzes and classifies the information, and a chapter making section that specifies chapters to the content recorded in the recording section based on hourly fluctuation of a number of the information related to the content and associates the chapter with a classification of the information during the period of the chapter.

In the above composition, the recording section receives broadcasting such as television broadcasting and records a content included in the television broadcasting or the like in a recording media or the like. The acquiring section acquires information related to the content from a network during the content of the television broadcasting or the like is on the air. Specifically, the information acquired here can be contributions posted to a predefined contribution site and posted times of the contributions. Here, the predefined contribution site is corresponding with the content, and the contributions concerning the content such as a feedback of the content or a substance of the content are posted to the contribution site. The chapter making section specifies the chapter of the content by using this correspondence. In other words, the chapter making section specifies the chapter of the content recorded in the recording section based on the hourly fluctuation of the number of the information related to the content, and associates the chapter with a classification of the information during the period of the chapter. Specifically, the chapter making section calculates a number of contributions and an hourly fluctuation of the number of contributions in the contribution site, specifies the chapter of the content recorded in the recording section based on the hourly fluctuation, and associates a classification of the chapter by analyzing the contributions during the period of the chapter.

As described above, by specifying the chapter based on the contributions or the like posted by the actual viewers, the chapters can be specified based on realistic responses of the viewers, and the classification is associated based on the feedback of the actual viewers. Accordingly, the chapter can be specified and classified automatically from the view point of the viewer.

Another alternative aspect of the present invention provides the chapter making section that associates the chapter with the classification based on the emotional expressions included in the information during the period of the chapter.

As described above, by associating the chapter with the classification based on the emotional expressions, the viewer can understand the feeling concerning the chapter from the classification when watching the content recorded in the recording section. Accordingly, a standard of judgment for selecting the chapter can be provided to the viewer when playing the content.

Another alternative aspect of the present invention provides a memory section that memorizes correspondence between a word, a numeric characteristic of the word and a classification of the word, wherein the chapter making section specifies the classification of each information by referring to the correspondence between the word included in the information during the period of the chapter and the numeric characteristic calculated from the word, and associates the chapter with a major classification included in the information during the period of the chapter.

As described above, when associating the chapter with the classification based on the correspondence between the word and the classification of the word, by using the numeric characteristic calculated from the word, a time for searching to specify the classification of the word can be shortened.

Another alternative aspect of the present invention provides the chapter making section that specifies a beginning of the chapter by going back a certain amount of time from the time when a significant change is occurred to the hourly fluctuation of the number of the information indicating an increase of the number of the information.

Various types of change can be assumed as the significant change occurred to the hourly fluctuation of the number of the information. In any case, the increase of the number of the information is a feature to indicate a climax of the contribution site and is linked to a climax of the content. Specifically, the significant change is a feature showing a peak position of the increase of the number of the information (e.g. contributions), a feature showing the beginning of the increase of the number of the information, a feature showing the end of the increase of the number of the information, for example. Note that the significant change is occurred a certain length of time after the scene causing the climax is on the air. In addition, although the significant change is related to the scene causing the climax, but the chapter should not be started from the climax time. The chapter should be specified including an introduction scene before the climax time.

Accordingly, by specifying a beginning of the chapter by going back a certain amount of time from the time when a significant change is occurred, a gap between the climax time of the contributions and climax time of the content can be eliminated or the introduction scene before the climax time can be included in the chapter.

Another alternative aspect of the present invention provides the chapter making section that associates the chapter with a major classification included in the information during the period when a significant change is occurred to the hourly fluctuation of the number of the information indicating an increase of the number of the information.

As described above, by associating the chapter with a major classification included in the information (e.g. contributions) during the climax time, the viewers can understand what a climax is included in each chapter when watching the content recorded in the recording section. Accordingly, a standard of judgment for selecting the chapter can be provided to the viewer when playing the content.

Another alternative aspect of the present invention provides a specified contributor recording section that records specified contributors who contemporary associate same classification of the information as the classification of the information associated by the user of the electronic device in a site on the network related to the content while the broadcasting is watched, wherein the chapter making section specifies the chapter to the content recorded in the recording section based on the hourly fluctuation of the number of the information calculated by adding a heavier weight to the information of the specified contributors than other information.

In the above composition, the specified contributor recording section accesses a site such as the contribution site related to the content when the user posted the contribution to the site by executing a certain operation while the broadcasting is watched, then searches and records specified contributors who contemporarily posted the contributions of same classification as the information (e.g. contribution) posted by the user. The specified contributors are assumed to feel similar emotion as the user of the electronic device and to have similar preference as the user of the electronic device. Therefore, the chapter making section specifies the chapter to the content recorded in the recording section based on the hourly fluctuation of the number of the information calculated by adding a heavier weight to the information of the specified contributors than other information. As described above, by adding a heavier weight to the information (e.g. contributions) of the specified contributors, the chapter is specified automatically based on the similar preference as the user of the electronic device.

Another alternative aspect of the present invention provides the chapter making section that associates the chapter with the classification based on a major classification included in the information during the period of the chapter calculated by adding a heavier weight to the information of the specified contributors than other information.

As described above, by adding a heavier weight to the information (e.g. contributions) of the specified contributors, the chapter is associated with the classification automatically based on the similar preference as the user of the electronic device.

Another alternative aspect of the present invention provides a weight making section that adds a heavier weight to the information associated by the specified contributors to cause the significant change to the number of the information calculated by adding the heavier weight, if the number of the information in the site does not indicate a significant increase although the number of the information associated by the specified contributors indicates a significant increase during a neighborhood period where the information is associated with the site related to the content while the content is watched.

As described above, the number of the information (e.g. contributions) of the specified contributors may indicate the climax (significant increase) even if the number of the information in the contribution site does not indicate the climax. In that case, the climax of the specified contributors who have similar preference as the user of the electronic device is assumed to be similar with the climax of the user. Therefore, by adding a heavier weight to the information of the specified contributors than other information, the number of the information in the contribution site is adjusted to indicate the climax (significant increase) when the number of the information of the specified contributors indicates the climax (significant increase). As described above, by using the adjustment, the chapter is specified corresponding to the preference of the user of the electronic device.

Another alternative aspect of the present invention provides the chapter making section that has a classification association method selection section that enables the selection of the following options:

to associate the chapter with the classification based on all the information related to the period of the chapter in the site, or to associate the chapter with the classification based on the information of the specified contributors during the period of the chapter in the site.

As described above, the usability can be improved by enabling the selection to associate the chapter with the classification based on the information (e.g. contributions) of all contributions or based on the information of the specified contributors.

Another alternative aspect of the present invention provides the chapter making section that has a chapter making method selection section that enables the selection of the following options:

to specify the chapter to the contents recorded in the recording section based on the hourly fluctuation of the number of the information calculated by adding a same weight to all the information, or to specify the chapter to the contents recorded in the recording section based on the hourly fluctuation of the number of the information calculated by adding heavier weight to the information of the specified contributors than other information.

As described above, the usability can be improved by enabling the selection to specify the chapter based on the number of the information (e.g. contributions) calculated by adding a same weight to all contributors or based on the number of the information calculated by adding heavier weight to the specified contributors.

The usability can be improved by appropriately displaying the chapter recorded in the above explained electronic device when playing the content.

In other words, the usability can be improved by;

displaying the classification corresponding with each content on the screen to display plural contents recorded in the electronic device, displaying the classification corresponding with each chapter on the screen to display the chapters of the content recorded in the electronic device, or displaying the playback screen of the content recorded in the electronic device having a content display area, a contribution display area that displays the contributions during the content was broadcasted synchronizing with the content, and an emotional expressions display area that displays the emotional expressions of the contributions synchronizing with the content.

In addition, the present invention can be achieved as a server device that transfers the content of the broadcasting. In other words, by adopting the following compositions, same functions and effects as the above described electronic device can be achieved:

a server device that transfers the contents of broadcasting to a client device, comprising:

a recording section that records a content extracted from the broadcasting, an acquiring section that acquires related information and related time from a site on the network related to the content during the content is on the air, a classification section that analyzes and classifies the information, a chapter making section that specifies chapters to the content recorded in the recording section based on hourly fluctuation of a number of the information in the site during the content is on the air and associates the chapter with a classification based on the information during the period of the chapter, and a delivering section that delivers the content in which the chapter is specified to a client device in accordance with a request from the client device.

In addition, by adopting the following compositions, a server device having same effect as the above described electronic device can also be provided:

a specified contributor recording section that records specified contributors who contemporary associate same classification of the information as the classification of the information associated by the user of the electronic device in a site on the network related to the content while the content is playing by the client device, wherein the chapter making section specifies the chapter to the content based on the hourly fluctuation of the number of the information calculated by adding a heavier weight to the information of the specified contributors than other information.

In addition, the present invention can also be achieved as a server device that transfers chapter information concerning the content of the broadcasting. In other words, by adopting the following compositions, chapter information can be transferred from the server device and chapters can be adequately specified to the content when the client device plays the recorded content:

a server device that transfers chapter information concerning the content of the broadcasting comprising;

an acquiring section that acquires related information and related times from a site on the network related to the content, a classification section that analyzes and classifies the information, a chapter making section that specifies chapter information of the content based on an hourly fluctuation of a number of the information during the content is on the air and associates the chapter with a classification based on the information during the period of the chapter information, and a delivering section that delivers the chapter information in accordance with a request from the client device.

In addition, by adopting the following compositions, a server device having same effect as the above described electronic device can also be provided:

a specified contributor recording section that records specified contributors who contemporary associate same classification of the information as the classification of the information associated by the user of the electronic device in a site on the network related to the content while the content is playing by the client device, wherein the chapter making section specifies the chapter information based on the hourly fluctuation of the number of the information calculated by adding a heavier weight to the information of the specified contributors than other information.

In addition, the above described electronic devise can also be achieved in various ways, by being built into another device or by being executed together with other methods, for example. In addition, the present invention can also be achieved as a recording system and recording/playback system having the above described electronic device, a recording method having the process corresponding to the above described electronic device, a recording program having the function corresponding to the above described electronic device, or a computer readable recording media recording the recording program.

In the present invention, the association of the information is a concept including contribution. However, the method to associate the information is not limited to the contribution to the contribution site. The method includes any methods that associate a certain information with another information.

The site means any information sources which can be accessed via the network. The internet is one of the network, but the network is not limited to the internet. However, large-scale network is suitable in general. In general, the site can accept the contributions from the contributor if the site is opened on the network and allows general users to associate the information.

The recording is a concept including an image recording. However, the recording is not limited to the image recording. The recording includes a recording of sounds and image data itself, for example.

The broadcasting is a concept including a television broadcasting. However, the broadcasting is not limited to the television broadcasting. The broadcasting includes a transfer of movies via the network, for example.

As explained above, the present invention can provide the electronic device that can specify the chapter and classification in accordance with the viewer's preference.

In addition, the following effects can be assumed.

A standard of judgment for selecting the chapter can be provided to the viewer when playing the content.

The searching to specify the classification of the word can be efficiently executed.

The beginning of the chapter can be specified so that the gap between the climax time of the information and climax time of the content can be eliminated or the introduction scene before the climax time can be included in the chapter.

The electronic device that specifies the chapter automatically based on the similar preference as the user of the electronic device can be provided.

The electronic device that associates the chapter with the classification automatically based on the similar preference as the user of the electronic device can be provided.

The chapter can be specified corresponding to the preference of the user of the electronic device.

The usability can be improved.

In addition, the playback device can improve the usability when plays the content.

In addition, the server device that efficiently specifies the chapter and associates the classification which are adequate for the viewer can be provided.

BRIEF DESCRIPTION OF THE DRAWINGS

FIG. 4 is an example of a configuration of an emotional expressions classification database.

FIG. 5 explains how to calculate a sum of letter values.

FIG. 7 is an example of a contribution data management database.

FIG. 14 is another example of a content selection screen.

FIG. 16 is an example of a chapter selection screen.

FIG. 23 is an example of a user information database.

DETAILED DESCRIPTION OF THE INVENTION

Figure 1:
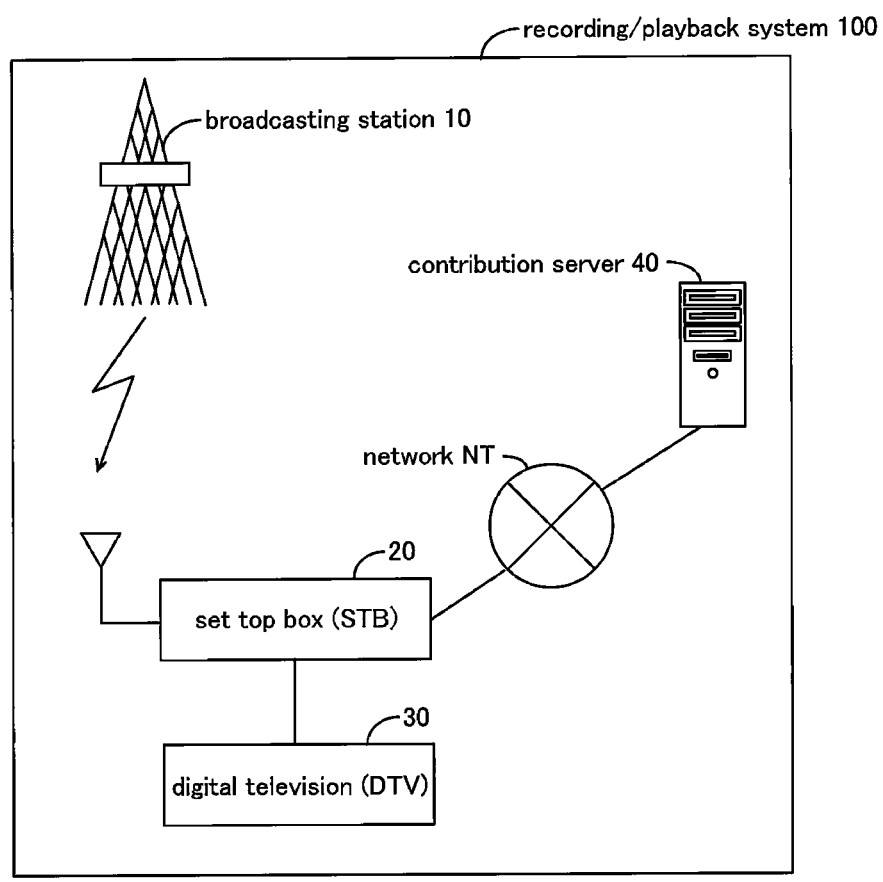
FIG. 1 is a block diagram showing a system configuration of a recording playback system concerning the first embodiment.

Hereinafter, embodiments of the present invention will be explained in the following order.
1. Configuration of the first embodiment:
2. Process of specifying chapters:
3. Playback of contents:
4. Configuration of the second embodiment:
5. Various examples:
1. Configuration of the first embodiment:

FIG. 1 is a block diagram showing a system configuration of a recording playback system concerning the first embodiment. A recording/playback system 100 shown in FIG. 1 is composed including a broadcasting station 10 of television broadcasting, a set top box (STB) 20, a digital television (DTV) 30 and a contribution server 40. The STB 20 is connected to the DTV 30. The STB 20 can output the television broadcasting received from the broadcasting station 10 or programs recorded in the STB 20 to the DTV 30. The DTV 30 can play the programs input from the STB 20 displaying images on a screen and outputting sounds from a speaker. In addition, the STB 20 is connected to the contribution server 40 via a network NT such as the internet. The STB 20 can access the contribution server 40 and acquire contributions from contribution sites provided by the contribution server 40.

Figure 2:
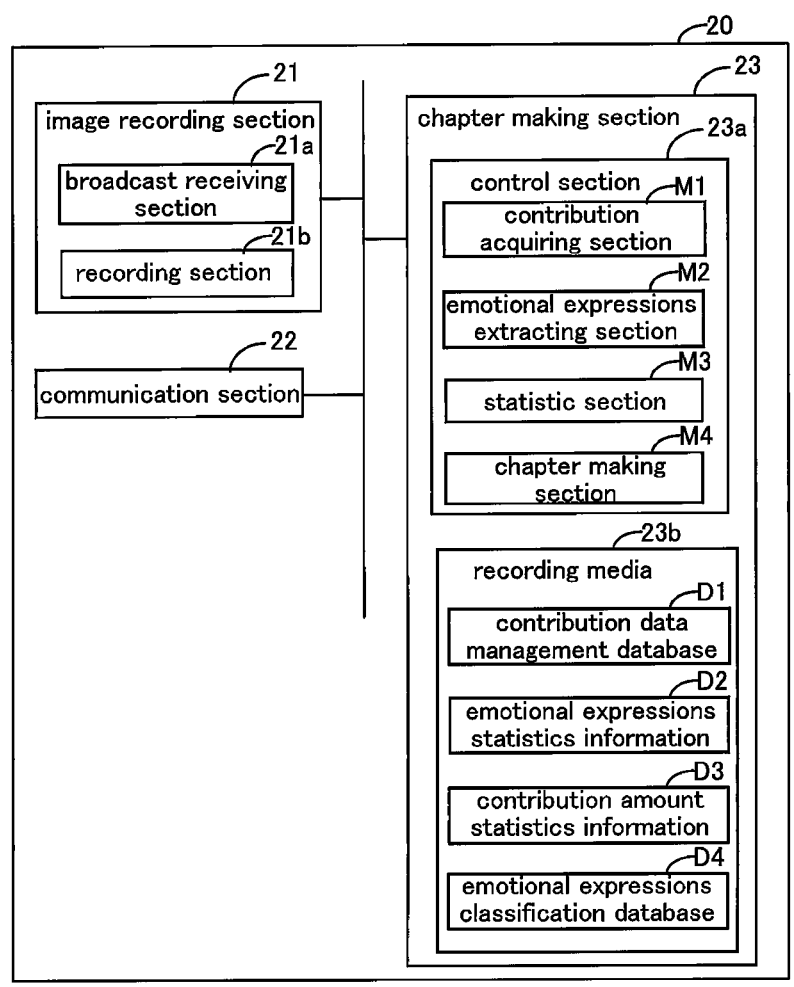
FIG. 2 is a block diagram showing a configuration of a STB 20.

FIG. 2 is a block diagram showing a configuration of the STB 20 that composes an electronic device such as a recording device, a playback device, a recording/playback device, or the like in the present embodiment. The STB 20 shown in FIG. 2 has an image recording section 21, a communication section 22 and a chapter making section 23. The image recording section 21 receives the television broadcasting and records contents such as videos and sounds of the program extracted from the received television broadcasting in recording media. The communication section 22 communicates with the contribution sites related to the program received by the image recording section and recorded in the recording media, and acquires contributions and posted times of the contributions. The chapter making section 23 specifies chapters to the contents recorded in the image recording section 21 based on an hourly fluctuation of the number of contributions, and associates the chapter with emotional expressions included in the contributions during the period of the chapter.

The image recording section 21 has a broadcast receiving section 21a and a recording section 21b. The broadcast receiving section 21a is composed of a tuner, an image processing section that executes processes for extracting contents from the broadcasting signals, a control section that controls each section, for example. If the broadcasting is a digital terrestrial broadcasting, the processes executed in the image processing section should be demodulation, demultiplexing, decoding of MPEG files, and so on. The broadcast receiving section 21a receives the television broadcasting and extracts the contents of the broadcast station concerning a channel number selected by a remote controller (not illustrated) or the like. The recording section 21b is composed of a recording media, a control section that controls a recording of the recording media, for example. The recording section 21b records the broadcast signals extracted by the broadcast receiving section 21a in the recording media.

Note that the type of the recording media and a recording method are not limited in particular. As well as currently known recording media, any kinds of recording media created in the future can be adopted. For example, a hard disk using a magnetic disk, a solid state drive using a semiconductor memory, a recordable CD and DVD including a blue lay disk using an optical disk are currently known as the recording media. In addition, the recording media can be built into the STB 20, connected to the STB 20 externally, or connected to the STB 20 via a wired/wireless network.

In addition, the television broadcasting received by the broadcast receiving section 21a can be not only the broadcastings transmitted through airwaves but also broadcastings of cable television sent via exclusive cables or broadcastings sent via generalized communication cables. Furthermore, the broadcasting can be a public broadcasting that transfers the broadcasting signals uni-directionally from the broadcasting station or an on-demand broadcasting that transfers the broadcasting signals bi-directionally in accordance with a request of the user. Specifically, the broadcasting can be analog terrestrial broadcasting, digital terrestrial broadcasting, cable television broadcasting, satellite broadcasting such as broadcasting satellite and communication satellite broadcasting, or on-demand broadcasting, for example.

Note that each control section that is explained as a component of each section can be realized as a software by executing a certain program on a CPU or a RAM, or realized as a hardware by using an IC such as an ASIC. In addition, each section of the STB 20 can be controlled by a single subject, or controlled by plural subjects separately set for each section and connected so as to communicate with each other via a bus communication or the like. Furthermore, each section of the device can also be controlled by a single subject, or controlled by plural subjects separately set for each section and connected so as to communicate with each other via a bus communication or the like. Of course, the subject can be composed together with other components or composed separately.

The communication section 22 is composed of an interface and a control section, for example. The communication section 22 is connected to a certain network such as the internet, and establishes communication according to the protocol of the network. Note that the type of the interface is not limited in particular. Any wired/wireless interfaces capable of connecting and communicating through network can be adopted.

The chapter making section 23 is composed of a control section 23a and a recording media 23b. The control section 23a realizes functions corresponding to a contribution acquiring section M1, an emotional expressions extracting section M2, a statistic section M3 and a chapter making section M4 by executing certain control processes. Note that the contribution acquiring section M1 can acquire any information other than the contribution. In such a sense, the contribution acquiring section M1 composes an acquiring section in the present embodiment. The recording media 23b is composed of a hard disk or a semiconductor memory, for example. The recording media 23b preliminary records emotional expressions classification database D4, and records a contribution data management database D1, emotional expressions statistics information D2 and contribution amount statistics information D3 after the control processes are executed by the control section 23a. Note that the recording media 23b composes a memory section in the present embodiment. Various functions realized by the chapter making section 23 are explained below by referring to FIG. 3.

2. Process for Specifying Chapters

Figure 3:
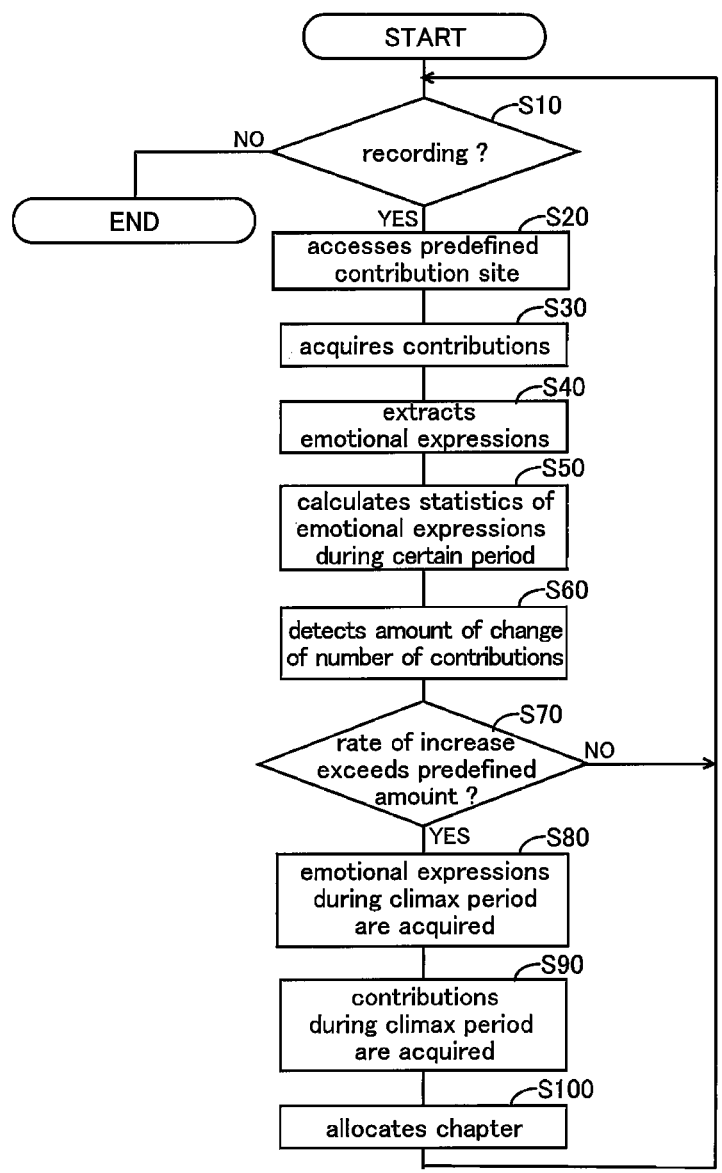
FIG. 3 is a flow chart showing a flow of specifying chapters.

FIG. 3 is a flow chart showing a flow of specifying chapters. The process to specify chapters shown in FIG. 3 is executed while recording the program that is currently on the air. In other words, the process of specifying chapters is executed simultaneously with the recording executed by the image recording section 21. The image recording section 21 starts recording in accordance with a recording instruction from a user via a remote controller (not illustrated), a recording instruction from the DTV 30, a recording instruction from an external device connected via the network NT, a timer recording, or other instructions, and the chapter making section 23 simultaneously starts the process of specifying chapters.

During the process of specifying chapters, it is repeatedly judged whether the recording is executed or not (S10). If the recording is finished (S10: No), the process of specifying chapters is finished. If the recording is continued (S10: Yes), steps S20 to S100 are executed repeatedly.

When the recording is continued, the contribution acquiring section M1 accesses a predefined contribution site (S20), and acquires the contributions concerning the recording program from the contribution site (S30). The contribution site from which the contributions are acquired may be one site or plural sites. The contribution site means the site from which contributions posted by general public and posted times of the contributions can be output. For example, Twitter (registered trademark), a social networking service, or a bulletin board site is one of the contribution sites. In addition, the contribution site explained later as the second embodiment can output identification information that is given to each contribution in order to distinguish a contributor.

At first, the contribution acquiring section M1 acquires program identification information to access the predefined contribution site. The program identification information is identification information to specify the contributions concerning the recording program from plural contributions. For example, a program identifier given to each contribution such as a hash code, or a URL of a bulletin board established for each program is one of the program identification information.

The contribution acquiring section M1 specifies the program identification information by accessing a predefined URL, for example. Specifically, the contribution acquiring section M1 acquires the hash code to specify the recording program or the URL of a bulletin board as the program identification information from a site providing program identification information such as a web page prepared by the broadcasting station, a web page prepared by the manufacturer or vendor of the STB 20, a television program list made by a volunteer, or the like.

If the contribution site has multiple bulletin boards, names of the bulletin boards are acquired sequentially, and then the URLs of the bulletin boards which contain the recording program name in their name are acquired as the program identification information. In case the bulletin boards are categorized (e.g. television, radio), time to acquire the program identification information can be shortened by acquiring only the bulletin boards included in the category of the program. In the social networking service, the program identification information can also be acquired by using the same method as the bulletin board. Note that certain information required for accessing the contribution site such as an account name and a password is recorded in the recording media of the STB 20 by the manufacturer, the vendor or the user of the STB 20.

Of course, in case the program identification information is fixed or predetermined, the program identification information can be preliminarily recorded in the recording media and can be acquired from it. Furthermore, in case a preparation order of the program identification information is predetermined, the program identification information can be generated automatically according to the preparation order.

Then, the emotional expressions extracting section M2 extracts emotional expressions from the contributions acquired by the contribution acquiring section M1 (S40). In other words, the emotional expressions extracting section M2 judges whether or not the emotional expressions are included in the contributions. In the present embodiment, the emotional expressions classification database D4 is preliminary prepared. In the emotional expressions classification database D4, the words indicating the emotional expressions are registered. Therefore, the emotional expressions are extracted by referring to the database.

FIG. 4 shows an example of the emotional expressions classification database. The emotional expressions classification database D4 is composed of an ID, a number of letters, a sum of letter values, an emotional expression (word) and a classification of the emotion. The emotional expression (word) and the classification of the emotion are assigned to the ID, the number of letters and the sum of letter values. In other words, zero to plural emotional expressions (words) and their classifications of the emotion are assigned to a numerical characteristic of the letter. By using the numerical characteristic of the letter, when judging whether a certain word is the emotional expression or not, the correspondence can be judged by referring to only the emotional expressions assigned to the numerical characteristics of the word. Consequently, processing time can be considerably shortened.

FIG. 5 explains how to calculate a sum of letter values. In FIG. 5, letters are aligned as a matrix and different numerical values are assigned to the vertical line and the horizontal line. For example, "00" is assigned to the horizontal line starting with "a", "10" is assigned to the horizontal line starting with "ka", "20" is assigned to the horizontal line starting with "sa", "30" is assigned to the horizontal line starting with "ta", "40" is assigned to the horizontal line starting with "na", "50" is assigned to the horizontal line starting with "ha", "60" is assigned to the horizontal line starting with "ma", "70" is assigned to the horizontal line starting with "ya", "80" is assigned to the horizontal line starting with "ra", "90" is assigned to the horizontal line starting with "wa", "01" is assigned to the vertical line starting with "a", "02" is assigned to the vertical line starting with "i", "03" is assigned to the vertical line starting with "u", "04" is assigned to the vertical line starting with "e", and "05" is assigned to the vertical line starting with "o." For example, in a word "ta-no-shi-i", the letter value of "ta" is "00+30=30"; the letter value of "no" is "04+40=44", the letter value of "shi" is "01+20=21", and the letter value of "i" is "01+00=01". Therefore the sum of letter values for "ta-no-shi-i" is "96". As explained above, by replacing each letter of the word to numerical values and adding them together, the sum of letter values can be easily calculated and does not often overlap between the words. Therefore, by using the sum of letter values, the words to search can be extremely reduced.

Note that the present embodiment is based on Japanese language, but it can also be applied to foreign languages by assigning double digit numbers to consonant sounds as the horizontal line and assigning single digit numbers to vowel sounds as the vertical line, and thus the sum of letter values can be calculated for the combination of consonant sounds and vowel sounds.

Figure 6:
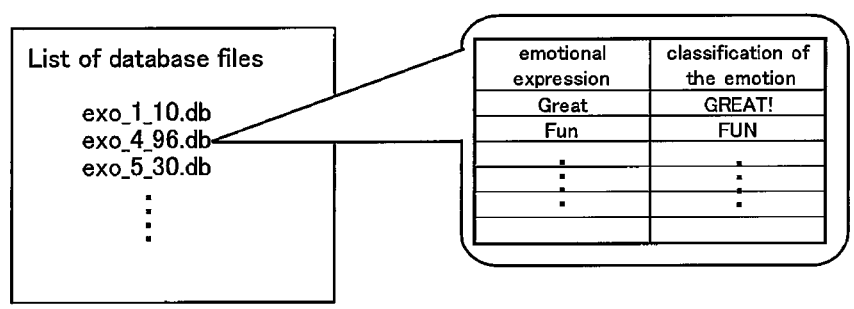
FIG. 6 is an example of a configuration of another emotional expressions classification database.

FIG. 6 is an example of a configuration of another emotional expressions classification database. In the emotional expressions classification database shown in FIG. 6, database files are created respectively for each numerical characteristic and the name of the database file contains the numerical characteristic. Therefore, the emotional expressions extracting section M2 specifies the file that contains the desired numerical characteristic calculated from the word by searching file names, and then judges the correspondence with the emotional expression (word) recorded in the specified file. Consequently, number of accesses to the database can be reduced, and thus overhead time before accessing the database and searching the record can be shortened.

After the emotional expressions are extracted, the contributions are registered in the contribution data management database D1. FIG. 7 is an example of the contribution data management database D1. As shown in FIG. 7, the contribution data management database D1 is composed including a contribution ID, a program ID, a posted time of the contribution, a contributor, a content of the contribution and a classification of the emotion. The contribution ID is unique for each contribution. The program ID is unique for each program and can be used to specify the contributions of each program when contributions concerning plural programs are managed in a single contribution data management database D1. The posted time of the contribution is the time when the contribution was posted. The contributor is an identifier of the user who posted the contribution. The content of the contribution is the data acquired by the contribution acquiring section M1. The classification of the emotion is emotional expressions extracted from the contribution by the emotional expressions extracting section M2. If the emotional expression is extracted from the contribution, the contribution is registered with the classification of the emotion in the contribution data management database D1. On the other hand, if the emotional expression is not extracted from the contribution, the contribution is registered without the classification of the emotion in the contribution data management database D1.

Then, the statistic section M3 calculates statistics of the emotional expressions during a certain period (S50). In other words, emotional expressions extracted from each contribution are counted with respect to each period, then a major emotional expression in the period is decided, and then the major emotional expression is recorded as the emotional expressions statistics information D2.

Then, the statistic section M3 detects an amount of change of the number of contributions (S60). In other words, the number of contributions is counted periodically and the rate of increasing number is detected being compared to the previous period.

Figure 8:
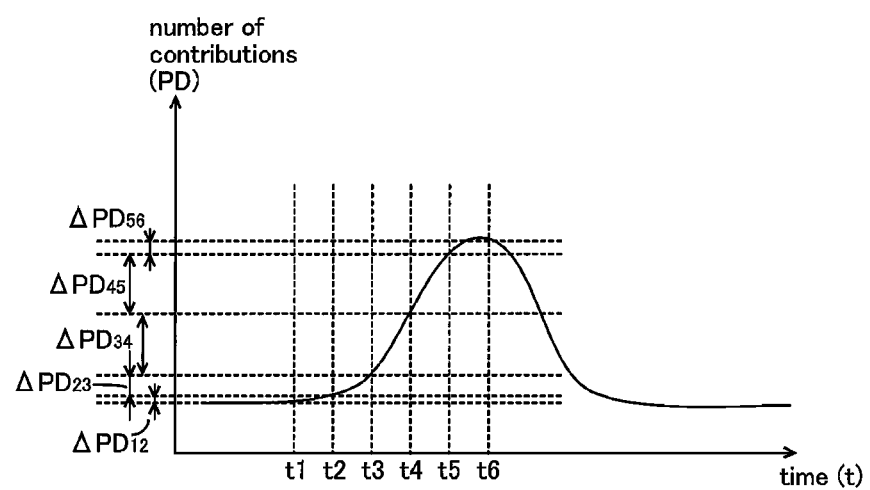
FIG. 8 explains an example to detect an amount of change of number of the contributions.

FIG. 8 explains an example to detect an amount of change of number of the contributions. In FIG. 8, the horizontal axis is the time (t), and the vertical axis is the number of contributions (PD). Intervals between t1, t2, t3, t4, t5 and t6 are constant. The change of the number of contributions between t1 and t2 is $\Delta PD12$, the change between t2 and t3 is $\Delta PD23$, the change between t3 and t4 is $\Delta PD34$, the change between t4 and t5 is $\Delta PD45$, the change between t5 and t6 is $\Delta PD56$. In FIG. 8, while the rate of increase from $\Delta PD12$ to $\Delta PD23$ is low, the rate is highly increased from $\Delta PD23$ to $\Delta PD24$. Compared to the previous period, if the detected rate of increase during the period exceeds a predefined amount, the period is judged as a climax time or a beginning of the climax time (S70: Yes). Note that the above explained feature where the rate of increase exceeds the predefined amount compared to the previous period is an example of a significant change in this embodiment.

Figure 9A:
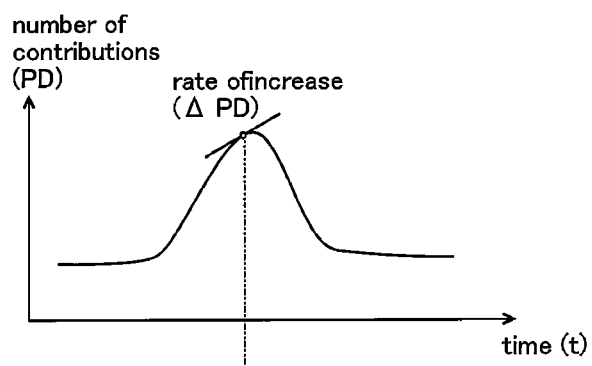
FIG. 9A and FIG. 9B explain another example to detect an amount of change of number of the contributions.
Figure 9B:
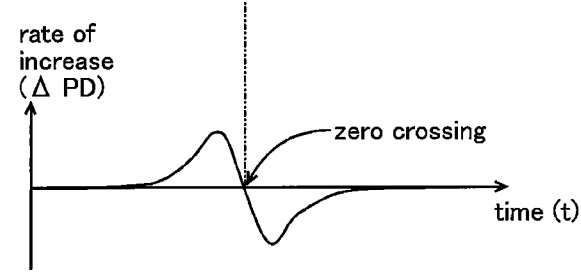

FIGS. 9A and 9B explain another example to detect an amount of change of number of the contributions. In FIG. 9A, the number of contributions (PD) is shown against the time (t). In FIG. 9B, the rate of increase ($\Delta PD$) that is calculated by differentiating the number of contributions is shown against the time (t). As shown in FIG. 9B, at the time when the rate of increase is zero crossing, the number of contributions reaches the maximum value. In other words, when the rate of increase is zero crossing, the time is judged as the climax time (S70: Yes). Note that the feature where the rate of increase is zero crossing is an example of a significant change in this embodiment.

If the climax time is detected as explained above, statistics of emotional expressions during a climax period are acquired from the emotional expressions statistics information D2 (S80), and contributions during the climax period are acquired from the contribution data management database D1 (S90). If the climax time is detected as explained in FIG. 8, the emotional expressions and contributions during a certain period after the specified climax time are acquired. If the climax time is specified as explained in FIG. 9, the emotional expressions and contributions during a certain period before the specified climax time or during a certain period before and after the specified climax time are acquired. Of course, the range of the period to acquire the emotional expressions can be determined by using various statistical methods such as the rise and fall of the peak, the half width of the peak, and so on.

Then, the chapter making section M4 allocates a chapter to the currently recording program based on the climax time (S100). The time to start the chapter is decided based on the standard explained in FIGS. 10 and 11 below.

Figure 10A:
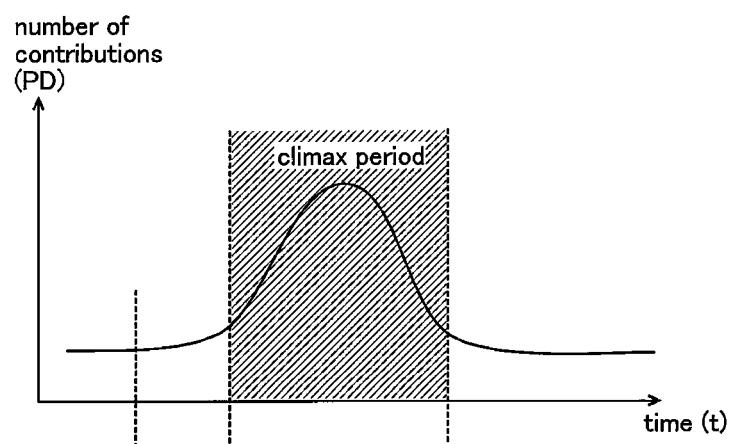
FIG. 10A and FIG. 10B show the first standard of a correspondence between a climax time and a time to which a chapter is specified.
Figure 10B:
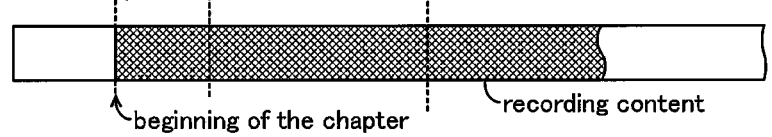

FIGS. 10A and 10B show the first standard of a correspondence between the climax time and the time to which the chapter is specified. As shown in FIG. 10B, the beginning of the chapter is specified by going back a certain amount of time (tx) from the exact climax time. Note that the climax period shown in FIG. 10A is specified by using the method explained in FIG. 8 and FIG. 9. The certain amount of time (tx) is a correction value to include scenes before the climax time to the chapter avoiding the chapter is started from the exact climax time. As explained above, the chapter is allocated by going back the certain amount of time (tx) from the climax time where the number of contributions (PD) is increased, and thus the chapter starts including the scenes before the climax time of the program.

Figure 11A:
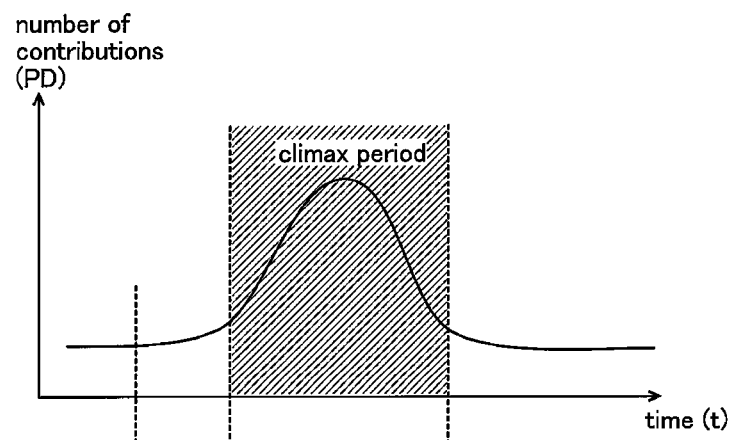
FIG. 11A and FIG. 11B show the second standard of a correspondence between a climax time and a time to which a chapter is specified.
Figure 11B:
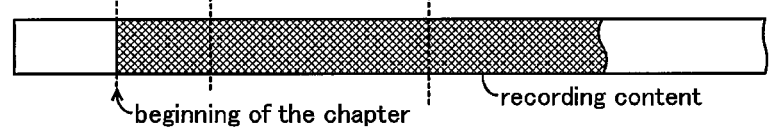

FIGS. 11A and 11B show the second standard of a correspondence between the climax time and the time to which a chapter is specified. As shown in FIG. 11B, the beginning of the chapter is specified by going back a certain amount of time (ty) from the climax time. Note that the climax period shown in FIG. 11A is specified by using the method explained in FIG. 8 and FIG. 9. The certain time (ty) is a correction value to eliminate the gap between the actual climax time on the program and the time the contributions are posted. As explained above, the chapter is allocated by going back the certain amount of time (ty) from the climax time where the number of contributions (PD) is increased, and thus the gap between the actual climax time on the program and the climax time on the contribution site can be eliminated.

By referring to the contribution data management database D1 corresponding to the period of the chapter specified as explained above, the climax time of the chapter can be specified, and the chapter can be associated with the contributions and the emotional expressions during the period of the chapter. Of course, the contributions and the emotional expressions corresponding to the climax time of the chapter can be extracted, associated and recorded.

In the present embodiment as explained above, the STB 20 for recording the contents of television broadcasting can efficiently allocate chapters by having the following components:

the image recording section 21 that receives the television broadcasting and records contents such as videos and sounds of the program extracted from the received television broadcasting in the recording media, the communication section 22 that communicates with the contribution sites related to the program received by the image recording section 21 and recorded in the recording media, and the chapter making section 23 that acquires the contributions and posted times of the contributions via the communication section 22, specifies chapters to the contents recorded in the image recording section 21 based on an hourly fluctuation of the contributions, and associates the chapter with the emotional expressions included in the contributions during the period of the chapter.

3. Playback of Contents

Figure 12:
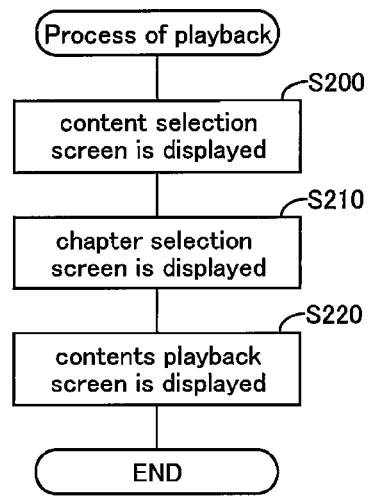
FIG. 12 shows a general flow of a playback.

By referring to FIG. 12, playback of the contents specified as explained above is shown. FIG. 12 shows a general flow of a playback. Of course, the order of the playback is not limited to this order. For example, S200 to S220 in FIG. 12 can be shuffled, individually displayed, or displayed in combination.

In the playback of the contents shown in FIG. 12, a content selection screen is displayed to select a desired content from the recorded contents (S200). Note that face marks explained later in the variation example are used in the following explanation as images to indicate the emotional expressions, but letters can also be used to indicate the emotional expressions as explained above.

Figure 13:
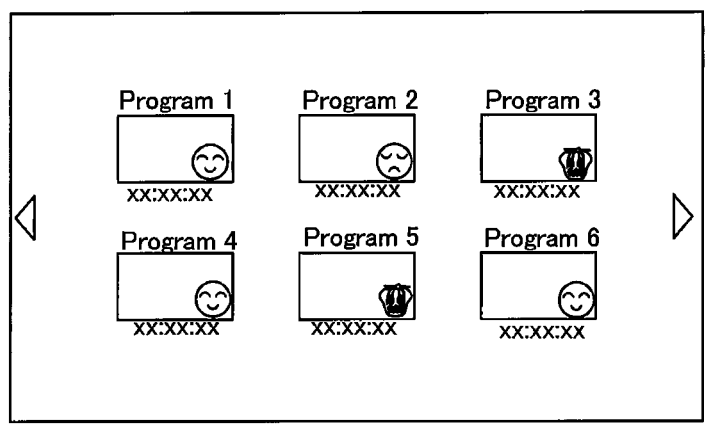
FIG. 13 is an example of a content selection screen.

FIG. 13 is an example of the content selection screen. In the content selection screen shown in FIG. 13, thumbnails concerning plural contents are displayed in order, and program names (file names) and playback times are displayed in association with the thumbnails. The thumbnail is a typical screen of the content. For example, the thumbnail can be the first image of the content or the image corresponding to the climax time specified in the above described process for specifying the chapter. In the content selection screen, by referring to the emotional expressions statistics information D2 and the contribution data management database D1, the emotional expressions during the climax period of the content are displayed in association with the content. The users can search the desired content by referring to the emotional expressions to select the content by using a remote controller (not illustrated) or the like.

FIG. 14 is another example of the content selection screen. In the content selection screen shown in FIG. 14, a frame composed of broadcast stations and airtimes as a matrix is displayed, and each content is displayed on the corresponding position in the frame. In FIG. 14, "Mar. 15, 2011" is selected in a date selection box displayed on the top left of the screen, and thumbnails of 6 contents broadcasted and recorded on the day are displayed on the corresponding positions in the frame. For example, the content shown on the top left of the frame was broadcasted from 1 am on Mar. 15, 2011 on the broadcast station 1. The users can search the desired airdate to select the content by using a remote controller (not illustrated) or the like.

Figure 15:
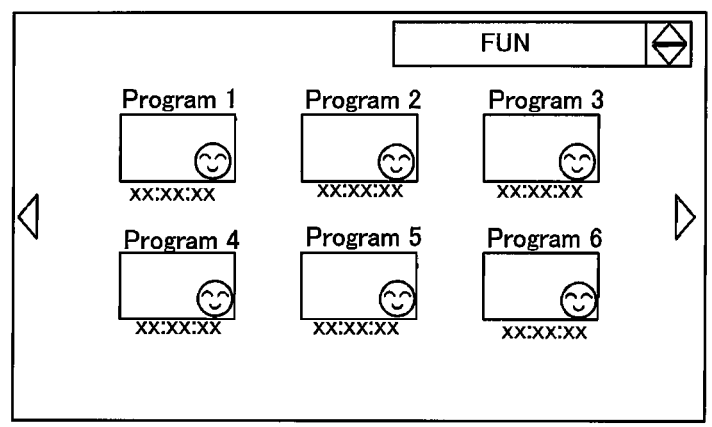
FIG. 15 is another example of a content selection screen.

FIG. 15 is another example of the content selection screen. The content selection screen shown in FIG. 15 has a search box in addition to the functions of the screen of FIG. 13. The users can enter letter strings or emotional expressions into the search box and then select the content from the displayed contents concerning the entered letter strings or emotional expressions. When searching by the emotional expressions, the desired emotional expressions can be selected from the emotional expressions classification database D4 or the letter strings entered in the search box can be converted based on the emotional expressions classification database D4.

After the content is selected, a chapter selection screen is displayed (S210). FIG. 16 is an example of the chapter selection screen. In the chapter selection screen shown in FIG. 16, a program title is displayed on the top left, and chapters specified to the program are displayed as a list. A chapter number, a chapter thumbnail, a reaction (emotional expression) of the user, a contribution data, a beginning time of the chapter, and an end time of the chapter are displayed for each chapter. In the contribution data area, contributions during the chapter are displayed. In the reaction (emotional expression) area, the emotional expression that is major in the chapter is displayed. Note that the contribution data corresponding to the emotional expression of the chapter is extracted from the contribution data management database D1 and a representative part of the contribution data is displayed on the chapter selection screen. Of course, if the contribution is a long sentence, except for a part (e.g. a beginning of the contribution, a part corresponding to the emotional expression) are abbreviated such as "- - -" when displaying.

The users can search the desired chapter by using a remote controller (not illustrated) or the like.

Figure 17:
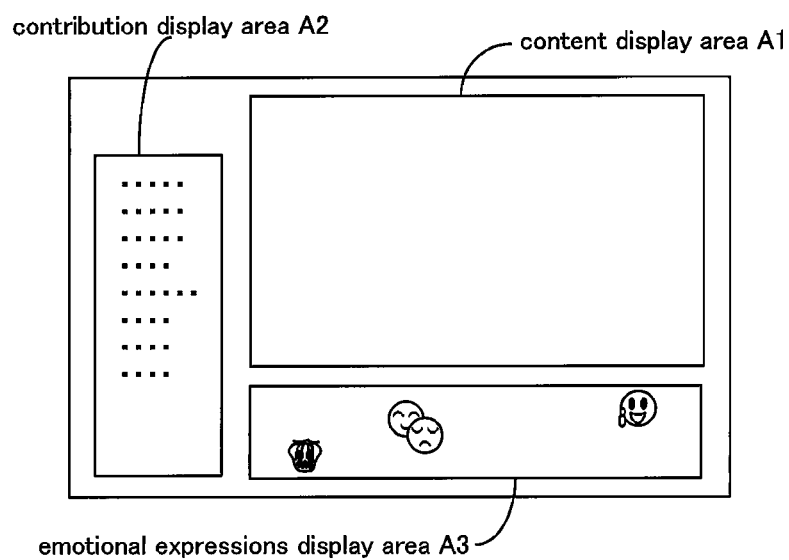
FIG. 17 is an example of a playback screen of contents.

After the chapter is selected, the content starts playing (S220). FIG. 17 is an example of a contents playback screen. The content playback screen shown in FIG. 17 has a content display area A1, a contribution display area A2, and an emotional expressions display area A3. In the content display area A1, the selected content to play is displayed. In the contribution display area A2, the contributions posted while the selected content was broadcasted are displayed. The contributions displayed on the screen change with time. For example, the contributions may be scrolled in accordance with the progress of the playing content. In the emotional expressions display area A3, the emotional expressions included in the contributions posted while the selected content was broadcasted are displayed. For example, the emotional expressions are displayed as face marks explained later in the variation example. The face marks according to the contributions can be displayed in a random position on the emotional expressions display area A3 in accordance with the time when the contribution is posted. Note that the emotional expressions display area A3 displays emotional expressions in the present embodiment, but can display other information about categories. In such a sense, the emotional expressions display area A3 composes a category display area in the present embodiment.

Figure 18:
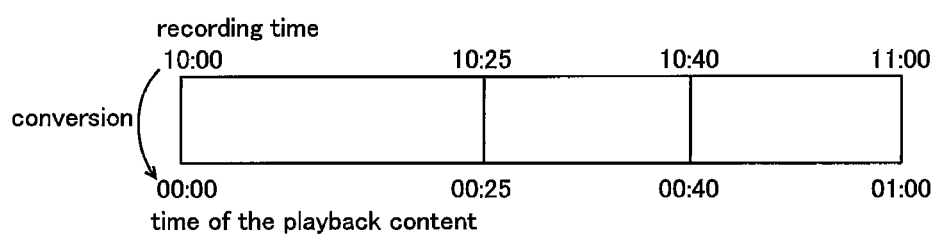
FIG. 18 explains a conversion of the time when synchronizing the time between the recording and the playback.

When extracting the contributions or emotional expressions from the contribution data management database D1 while the content is played, the time is converted as shown in FIG. 18 in order to synchronize the time between the recording and the playback. In other words, because the recording date and time is recorded in the content, by converting each time of the playback content to comply with the recording date and time, the contributions and emotional expressions corresponding to the recording time can be acquired from the contribution data management database D1.

By playing the contents as explained above, the content selection screen, the chapter selection screen, and the contents playback screen can be displayed based on the emotional expressions helping the user to select the desired screen. Furthermore, in the contents playback screen, contributions and emotional expressions synchronized with the playback position can be stimulatory displayed helping the user to increase a sense of presence.

4. Configuration of the Second Embodiment

In the first embodiment described above, in case the preference of the user is different from that of a population (contributors of the contribution site), chapters may be specified or emotional expressions may be associated without matching the user' preference. To avoid the above problem, the judgment of the climax time and the decision of emotional expressions associated with the chapter are corrected to match the user's preference. Specifically, by adding a weight to the contributions posted by the contributors who have similar preference with the user, the number of the contributions is increased corresponding to the user's preference and emotional expressions corresponding to the user's preference become major at the climax time.

Figure 19:
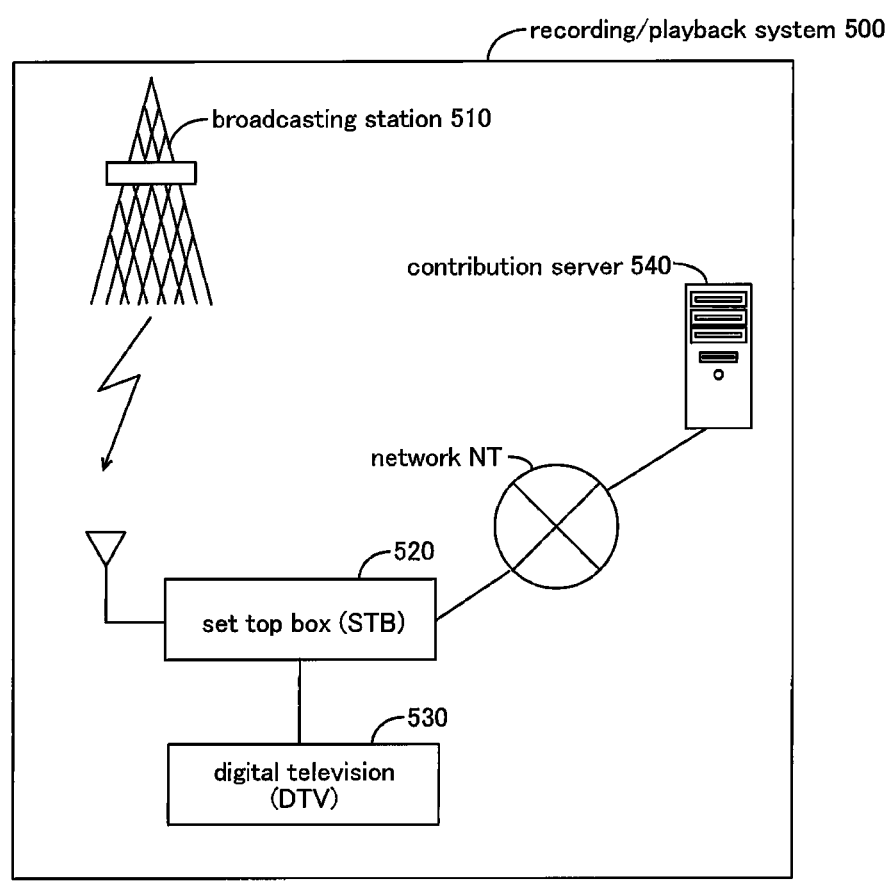
FIG. 19 is a block diagram showing a system configuration of a recording playback system concerning the second embodiment.

FIG. 19 is a block diagram showing a system configuration of a recording playback system concerning the second embodiment. A recording/playback system 500 shown in FIG. 19 is composed of a broadcasting station 510 of the television broadcasting, a set top box (STB) 520, a digital television (DTV) 530 and a contribution server 540. The STB 520 is connected to the DTV 530. The STB 520 can output the television broadcasting received from the broadcasting station 510 or programs recorded in the STB 520 to the DTV 530. The DTV 530 can play the programs input from the STB 520, display images on a screen, and output sounds from a speaker. In addition, the STB 520 is connected to the contribution server 540 via a network NT such as the internet. The STB 520 can access the contribution server 540 and acquire contributions from contribution sites provided by the contribution server 540.

Figure 20:
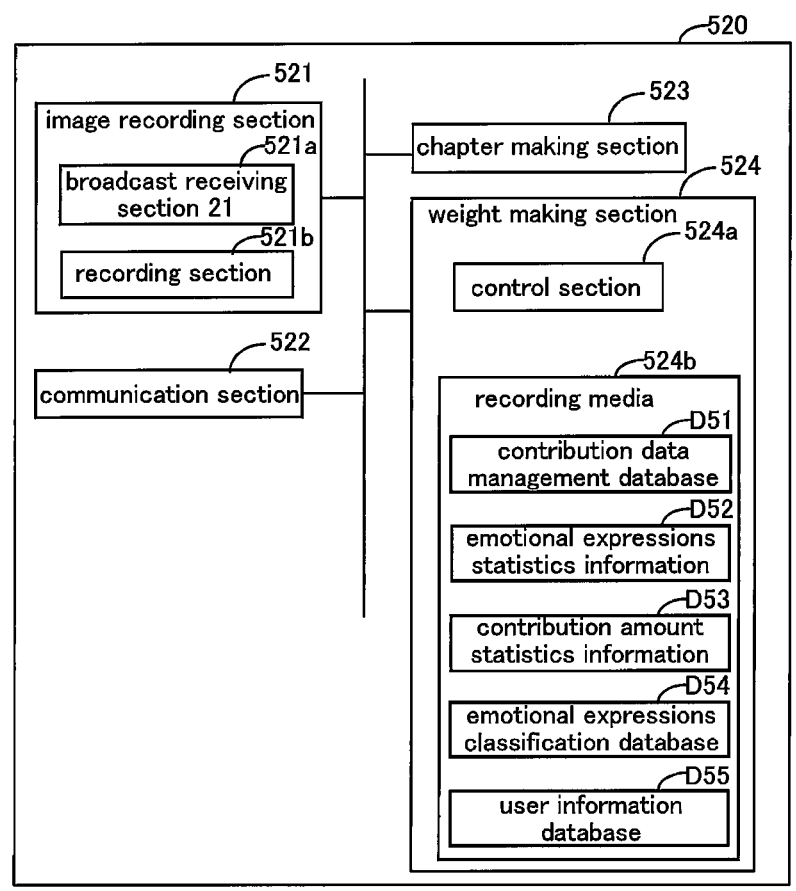
FIG. 20 is a block diagram showing a configuration of the STB 20 concerning the second embodiment.

FIG. 20 is a block diagram showing a configuration of the STB 520. The STB 520 has an image recording section 521, a communication section 522, a chapter making section 523 and a weight making section 524. The explanation of the image recording section 521 and the communication section 522 are omitted because the configuration and functions are same as the image recording section 21 and the communication section 22 explained in the first embodiment. The chapter making section 523 is almost same as the chapter making section 23 explained in the first embodiment. The explanation about the configuration and functions in common with the chapter making section 23 are omitted, but the chapter making section 523 is different from the first embodiment with respect to the use of the weight made by the weight making section 524 when specifying chapters. In other words, the chapter making section 523 specifies chapters to the content recorded in the image recording section 521 based on an hourly fluctuation of the number of the contributions by adding a weight to the contributions acquired via the communication section 522, and associates the chapter with the emotional expressions included in the contributions during the period of the chapter by adding a weight to the contributions. The weight making section 524 makes a weight adding to the contributors who have similar preference with the user by using a process of making a weight explained later.

The weight making section 524 is composed of a control section 524a and a recording media 524b. The control section 524a realizes each function of the weight making section 524 by executing certain control processes. The control section 524a and the recording media 524b can be shared with the control section and the recording media of the chapter making section 523. The recording media 524b preliminary records an emotional expressions classification database D54, and records a contribution data management database D51, emotional expressions statistics information D52, contribution amount statistics information D53, and a user information database D55 after the control processes are executed by the control section 524a in same procedure as the above explained first embodiment. The functions realized by the weight making section 524 are explained below by referring to the FIG. 21.

Figure 21:
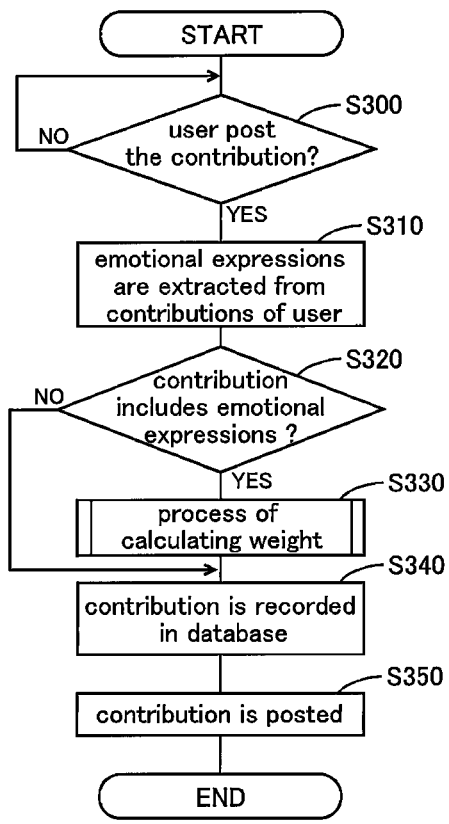
FIG. 21 is a flow chart showing a general process of making a weight.

4-1. Process of Making a Weight:

FIG. 21 is a flow chart showing a general process of making a weight. The process shown in FIG. 21 is executed while the user is watching the program that is currently on the air. During the process of making a weight, whether the user posts the contribution or not is judged repeatedly (S300). If the contribution of the user is detected (S300: Yes), the weight making section 524 analyzes the contribution of the user and judges a necessity and an amount of the weight to be added when associating the emotional expressions or judging the climax time (S310 to S350).

In the steps S310 to S350, firstly the contribution of the user is acquired and the emotional expressions are extracted from the acquired contribution (S310). In other words, the weight making section 524 judges whether or not the contribution includes any elements indicating the emotional expressions. More specifically, the emotional expressions are extracted by referring to the emotional expressions classification database D54 that is similar to the emotional expressions classification database D4 explained in the first embodiment. If the contribution includes the emotional expressions (S320: Yes), the weight is changed by using a process of calculating the weight (S330). The process of calculating the weight is explained later.

If the process of calculating the weight is finished or the contribution doesn't include the emotional expressions (S320: No), the contribution of the user is recorded (S340). More specifically, an identifier is added to the contribution to indicate the contribution is posted by the user, and then the contribution is recorded in the contribution data management database D51. After the process of making a weight is finished as explained above, the contribution is posted to the contribution site (S350). Of course, a timing to post to the contribution site can be changed if needed.

Figure 22:
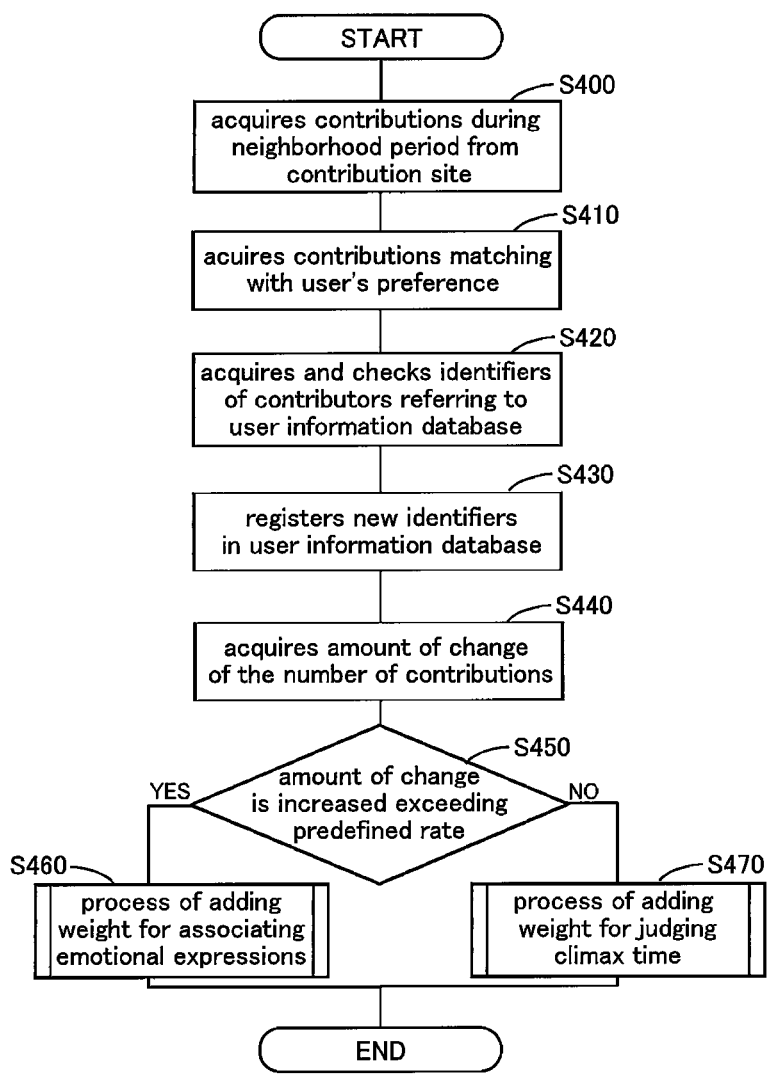
FIG. 22 is a flow chart showing a detailed process of making a weight.

4-2. Process of Calculating the Weight:

FIG. 22 is a flow chart showing a detailed process of calculating the weight executed in the step S330 of the process of making a weight. If the process of calculating the weight is started, by specifying a neighborhood period that contains the posted time when the user posted the contribution and a certain past period before the posted time, the data of contributions (contents of the contributions, posted times, and identifiers of the contributors) during the neighborhood period are acquired from the contribution site (S400). The acquired contributions are registered in the contribution data management database D51, and emotional expressions are associated by using the same classification as the first embodiment. In addition, the amount of change of the number of contributions during the neighborhood period is detected, and the contribution amount statistics information D53 is generated concerning the program that the user is watching. Furthermore, the emotional expressions are calculated at regular time intervals, and the emotional expressions statistics information D52 is generated. Note that the range of the neighborhood period is decided to enable the judgment of the climax.

Then, the contributions matching with a "classification (user's preference)" of the emotional expressions included in the contribution of the user are acquired (S410). In other words, the emotional expressions classified in the same classification as the emotional expressions extracted in the step S310 are extracted from the contributions acquired in the step S400. The identifiers of the contributors are acquired, and then the identifiers are checked by referring to the user information database D55 (S420). In the identifiers of the contributors acquired in the step S420, if there are any identifiers which are not registered in the user information database D55, the identifiers are registered in the in the user information database D55 (S430). Note that the default value of the weight added to the newly registered user may be a certain default value such as "1", or a certain additional value can be added to the default value according to the number of correspondences with the user's preference. The recording media 524b that records user information database D55 composes a specified contributor recording section in the present embodiment.

FIG. 23 is an example of the user information database D55. In FIG. 23, the user information database D55 is a database for associating various weights with a registration ID to identify the user on the device, a user name on the contribution site, and a service name of the contribution site. The identifiers of the contributors acquired in the step S420 is corresponding to the user name on the contribution site. The various weights are specified individually for each category of the program such as sports, news, dramas and comedies, because the user's preference may differ depending on the category of the program. In addition, a weight for judging the climax time and a weight for associating the emotional expressions during each period are separately specified. That is because the climax time is judged based on all the number of the contributions, while the emotional expressions are associated based on the contributions included in the classification of the emotional expression that is major as explained in the first embodiment, and thus they are different in property.

In addition, the amount of change of the number of contributions before and after the posting of the user is acquired (S440). The amount of change of the number of the contributions can be calculated by referring to the contribution amount statistics information D53 specified in the step S400. More specifically, the amount of the change can be calculated by using the same method as the step S60 in the first embodiment described above.

In the neighborhood period of the contribution of the user, if the amount of change is increased exceeding a predefined rate compared to the previous period (S450: Yes), the posted time of the user is judged to match the climax time of the contribution site and then go to a process of adding a weight for associating the emotional expressions (S460). In other words, because the preference of the user matches that of the major contributors in the contribution site, there is no need to correct the climax time judged based on all the number of the contributions. On the other hand, if the amount of change is not increased exceeding a predefined rate compared to the previous period (S450: No), the posted time of the user is judged without matching the climax time of the contribution site, and then go to a process of adding a weight for judging the climax time (S470). Unless the judgment of the climax time is corrected by using the weight, the chapter may be specified without matching the user's preference.

Figure 24:
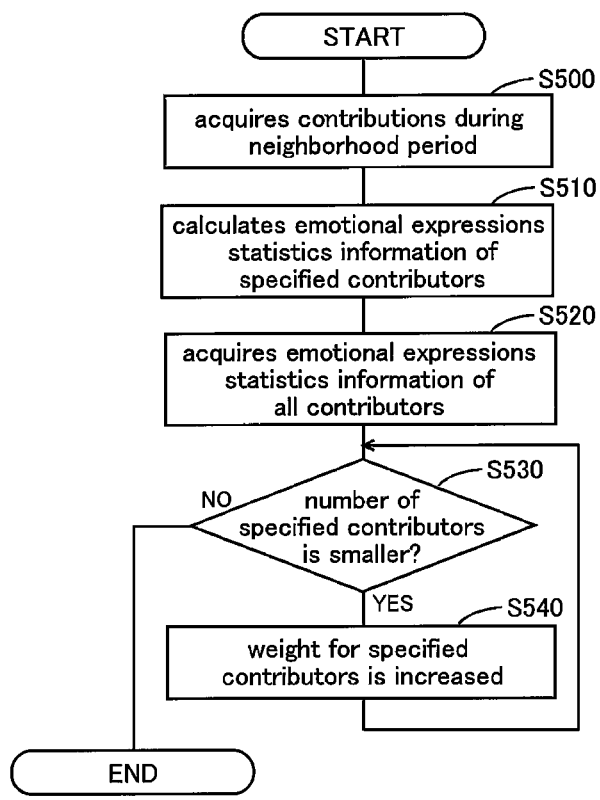
FIG. 24 is a flow chart showing a process to adjust a weight for an emotional expressions classification database.

4-3. Process of Adding a Weight for Associating the Emotional Expressions:

FIG. 24 is a flow chart showing a process to adjust a weight for adding to the contributions posted by the specified contributors when associating the emotional expressions executed in the step S460 described above. Note that the specified contributors mean the contributors who are registered in the user information database D55 and have similar preference as the user. At first, the contributions during the neighborhood period are acquired from the contribution data management database D51 (S500), and then the emotional expressions statistics information of the specified contributors during the neighborhood period is calculated (S510). In addition, the emotional expressions statistics information of all the contributors during the neighborhood period specified in the step S400 is also acquired (S520).

Then, a number of a major emotional expression "Esmax" that is major in the emotional expressions statistics information of the specified contributors is compared to a number of major emotional expressions "Eamax" that is major in the emotional expressions statistics information of all contributors (S530). If the Esmax is larger than the Eamax (S530: No), the process in FIG. 24 is finished because the classification of the emotional expressions that is major in the specified contributors is corresponding to that of all the contributors and there is no need to change the weight.

On the other hand, if the Esmax is smaller than the Eamax (S530: Yes), the Esmax should be corrected to exceed the Eamax by adding a heavier weight to the specified contributors because the classification of the emotional expressions that is major in the specified contributors is not corresponding to that of all the contributors. The weight for associating the emotional expressions for the specified contributors is increased in a certain amount (S540) and the judgment of the step S530 is repeated. Note that the numbers of the major emotional expressions Esmax and Eamax are calculated by adding the weight specified in the user information database D55 to the contributions of the specified contributors who are registered when the calculation is executed. By adjusting the weight as explained above, the classification of the emotional expressions associated to the content recorded when the contribution is posted by the user (when the climax time) matches the user's preference.

Figure 25:
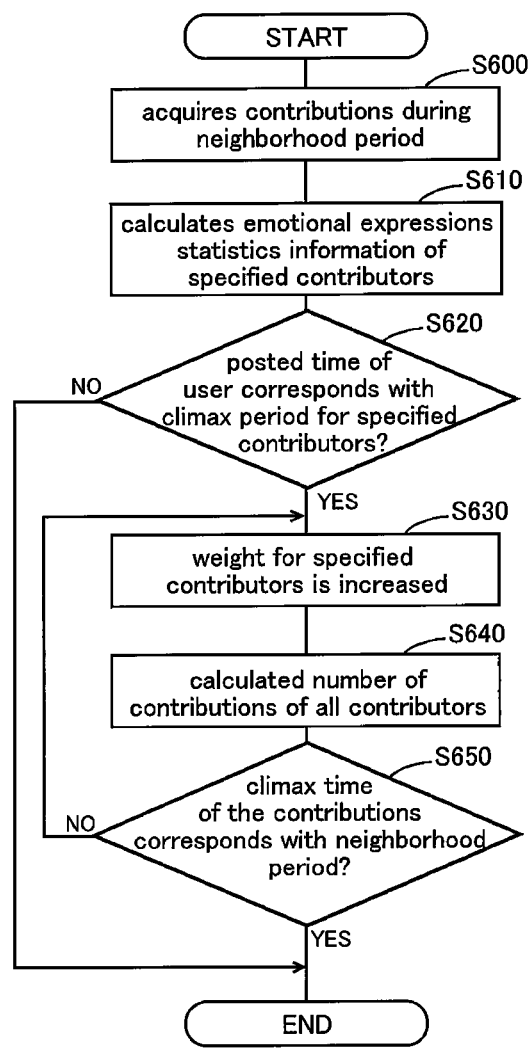
FIG. 25 is a flow chart showing a process to adjust a weight for judging the climax time.

4-4. Process of Adding a Weight for Judging the Climax Time:

FIG. 25 is a flow chart showing a process to adjust a weight for adding to the contributions posted by the specified contributors when judging the climax time executed in the step S470 described above. At first, the contributions during the neighborhood period are acquired from the contribution data management database D51 (S600), and then the emotional expressions statistics information of the specified contributors during the neighborhood period is calculated (S610). Based on the calculated emotional expressions statistics information, the climax period for the specified contributors is specified, and then the correspondence between the posted time of the contribution of the user and the climax period for the specified contributors is judged (S620).

If the posted time of the contribution of the user corresponds with the climax period for the specified contributors, the number of contributions for the specified contributors is corrected to increase the weight of the specified contributors when calculating the number of the contributions for judging the climax time (S630-S650). In other words, the weight for specified contributors for judging the climax time registered in the user information database D55 is increased in a certain amount (S630), then the number of contributions of all contributors during the neighborhood period is calculated by using the corrected weight (S640), and then the correspondence between the climax time of the contributions and the neighborhood period is judged (S650). If the climax time of the contributions is not corresponding with the neighborhood period (S650: No), the correction is repeated until the climax time for the specified contributors corresponds with the neighborhood period (S630 to S650). If the climax time of the contributions is corresponding with the neighborhood period (S650: Yes), the process is finished because the correction is completed. As explained above, by adjusting the weight for judging the climax time for the specified contributors, the climax time judged by the number of all the contributions can be corrected to match the user's preference.

4-5. Process of Specifying Chapters Concerning the Second Embodiment:

When the weights of the specified contributors are specified as explained above, the process of specifying chapters is basically same as the above described first embodiment but differs in the following points.

At first, when the emotional expressions statistic information is calculated in the step S50, the contributor of each contribution is identified by the identifier, and then the number of contributions is calculated with the weight is added to the contributions of the specified contributors. For example, if the contributor who has the weight of "1.5" for associating the emotional expressions in the category of the recording program posted contributions 5 times during a certain period, the number of contributions of the contributor is corrected as "7.5" times. Therefore, the classification of the contributors who have similar preference with the user is strongly reflected to the classification and is likely to be judged as major in the period.

In addition, when detecting the amount of change of the number of contributions to judge the climax time in the step S60, the number of contributions is calculated with the weight is added to the contributions of the specified contributors. For example, if the contributor who has the weight of "1.8" for judging the climax time in the category of the recording program posted contributions 4 times during a certain period, the number of contributions of the contributor is corrected as "7.2" times. Therefore, the climax time of the contributors who have similar preference with the user is likely to become the climax time in all the contributions.

In addition, the time to allocate the chapter in the steps S80 to S100 is decided based on the climax time corrected by the weight for judging the climax time. Furthermore, the classification of the emotional expressions is associated based on the climax time corrected by the weight for associating the emotional expressions. Therefore, the chapter is specified corresponding with the user's preference, and the chapter is associated with the classification of the emotional expressions corresponding with the user's preference.

In addition, when calculating the number of the contributions in order to judge the climax time, it is possible to let the user select one of the following option: to calculate the number by adding the weight for judging the climax time to the specified contributors as explained above or to calculate the number without adding the weight for judging the climax time to the specified contributors. For example, it can be selectable by preparing an item to select the method for specifying chapters on a menu screen that is displayed when operating a certain key of a remote controller (not illustrated). The item to select the method of specifying chapters composes a chapter making method selection section in the present embodiment. Similarly, as for the classification associated with each chapter, when calculating the number of the contributions in order to decide a major classification of the contributions, it is possible to let the user select one of the following option: to calculate the number by adding the weight for associating the emotional expressions to the specified contributors as explained above or to calculate the number without adding the weight for associating the emotional expressions to the specified contributors. It can also be selectable by preparing an item to select the method for associating the chapter with the classification on the menu screen that is displayed when operating a certain key of a remote controller (not illustrated). The item to select the method for associating the chapter with the classification composes a classification association method selection section in the present embodiment.

As explained above, the second embodiment is composed of:

a playback section that plays contents extracted from broadcasting signals of the television broadcasting, the STB 520 having the image recording section 521 that records the contents extracted from the television broadcasting in a recording media, the user information database D55 that records the specified contributors who contemporarily posted the contributions of same classification as the contribution posted from the STB 520 to contribution site related to the contents while the contents are played by the playback section, and the chapter making section 523 that specifies the chapter to the contents recorded in the image recording section based on the hourly fluctuation of the number of contributions calculated by adding a heavier weight to the contributions of the specified contributors and specifies the classification of the chapter based on the contributions during the period of the chapter.

In other words, by increasing the weight to the specified contributors who has similar preference with the user of the STB 520 than the other contributors when calculating the number of the contributions, the chapters specified based on an hourly fluctuation of the contributions are likely to be reflected by the user's preference.

5. VARIOUS EXAMPLES 5-1. Variation Example 1

Figure 26:
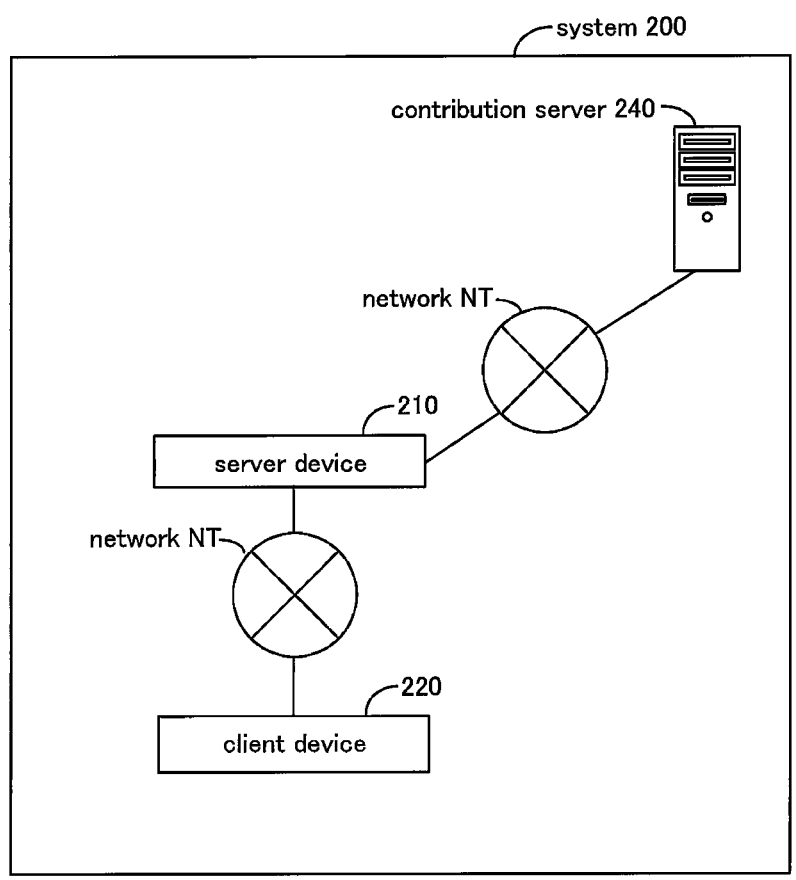
FIG. 26 shows a recording and playback system concerning a variation example 1.

The processes of recording contents and specifying chapters explained above can also be executed on a server device that is connected to the network, and the contents and the chapter information can be transferred in accordance with a request from a client device. FIG. 26 shows a recording and playback system concerning a variation example 1. A system 200 is composed of a server device 210 that records contents and specifies chapters, a client device 220 that receives the contents and the chapter information from the server device 210, and a contribution server 240 that has same functions as the above explained contribution server. The server device 210 preliminary records the emotional expressions classification database D4, acquires contributions by communicating with the contribution server 240, and executes the process of specifying chapters by using the same process as the STB 20 explained in the first embodiment. By using the above configuration, the contribution data management database D1, the emotional expressions statistics information D2 and the contribution amount statistics information D3 are specified and recorded in the recording media together with the contents.

The client device 220 can request the server device 210 to transfer the contents anytime. If the request is received, the server device 210 specifies thumbnails, contribution data, emotional expressions, and other information, and then transfers them to the client device 220. On the client device 220, the user can request the content and the chapter to the server device 210 by operating an operating section to select the content and the chapter. The server device 210 transfers the requested content together with the contributions posted to the contribution server 240 when the content is broadcasted and the emotional expressions specified by the statistics of the contributions. The client device 220 plays the content together with its contributions and emotional expressions. As explained above, the present invention can be achieved as the server device.

5-2. Variation Example 2

The server device 210 may be the device only to specify chapters. In that case, the client device records the contents, and receives the data of the chapters from the server device when needed. By dividing the function of the recording contents with the function of specifying chapters as explained above, loads of the client device and the contribution server can be reduced. In case the server device only specifies the chapter, the acquiring of the contributions continues from the beginning to the end of the broadcasting time. The statistics and the specifying of the chapter can be executed when the contributions are acquired or can be executed separately later.

5-3. Variation Example 3

When transferring the data of chapters from the server device to the client device, whether to transfer the chapters specified on the server or to transfer the chapters preliminary specified in the contents may be decided by the user of the client device. The data of chapters specified on the server means the chapters specified by the same process as the embodiment explained above. On the other hand, the data of chapters preliminary specified means the chapters specified in the provider of the content such as the broadcast station. By using the variation example 3, the usability can be improved.

5-4. Variation Example 4

In the embodiment described above, the emotional expressions are judged by referring to the letters included in the contributions, but the emotional expressions can also be judged by referring to face marks in case the face marks are available in the contribution sites. In the variation example 4, the data indicating the correspondence between the face marks and the letter codes of emotional expressions is recorded as the emotional expressions classification database explained in the embodiment above.

Note that, this invention is not limited to the above-mentioned embodiments. Although it is to those skilled in the art, the following are disclosed as the one embodiment of this invention.

- Mutually substitutable members, configurations, etc. disclosed in the embodiment can be used with their combination altered appropriately.
- Although not disclosed in the embodiment, members, configurations, etc. that belong to the known technology and can be substituted with the members, the configurations, etc. disclosed in the embodiment can be appropriately substituted or are used by altering their combination.
- Although not disclosed in the embodiment, members, configurations, etc. that those skilled in the art can consider as substitutions of the members, the configurations, etc. disclosed in the embodiment are substituted with the above mentioned appropriately or are used by altering its combination.

While the invention has been particularly shown and described with respect to preferred embodiments thereof, it should be understood by those skilled in the art that the foregoing and other changes in form and detail may be made therein without departing from the sprit and scope of the invention as defined in the appended claims.

What is claimed is:

1. An electronic device having a recording section that records a content extracted from broadcasting, comprising:
   an acquiring section that acquires contributions related to the content from a contribution site on a network,
   a classification section that analyzes and classifies the contributions, and
   a chapter making section that specifies chapters to the content recorded in the recording section based on hourly fluctuation of a number of the contributions related to the content and associates the chapter with a classification of the contributions during the period of the chapter,
   the chapter making section specifies the chapter to a period including at least time when a rate of increase of the hourly fluctuation exceeds a predefined amount and time when the hourly fluctuation changes to decrease from increase.

2. The electronic device according to claim 1, wherein the chapter making section associates the chapter with the classification based on the emotional expressions included in the contributions during the period of the chapter.

3. The electronic device according to claim 1, further comprising:
   a memory section that memorizes correspondence between a word, a numeric characteristic of the word and a classification of the word, wherein
   the chapter making section specifies the classification of each contributions by referring to the correspondence between the word included in the contributions during the period of the chapter and the numeric characteristic calculated from the word, and associates the chapter with a major classification included in the contributions during the period of the chapter.

4. The electronic device according to claim 1, wherein the chapter making section specifies a beginning of the chapter by going back a certain amount of time from the time when the rate of increase of the hourly fluctuation exceeds the predefined amount.

5. The electronic device according to claim 1, wherein the chapter making section associates the chapter with a major classification included in the contributions during the period of the chapter.

6. The electronic device according to claim 1, further comprising:
   a specified contributor recording section that records specified contributors who contemporary post the contributions of the same classification as the contributions posted by the user of the electronic device in the site on the network related to the content while the broadcasting is watched, wherein
   the chapter making section specifies the chapter to the content recorded in the recording section based on the hourly fluctuation of the number of the contributions calculated by adding a heavier weight to the contributions of the specified contributors than other information.

7. The electronic device according to claim 6, wherein the chapter making section associates the chapter with the classification based on a major classification included in the contributions during the period of the chapter calculated by adding a heavier weight to the contributions of the specified contributors than other information.

8. The electronic device according to claim 6, further comprising:
a weight making section that adds a heavier weight to the contributions posted by the specified contributors to cause a significant change to the number of the contributions calculated by adding the heavier weight, if the number of the contributions in the site does not indicate a significant increase although the number of the contributions posted by the specified contributors indicates a significant increase during a neighborhood period where the contributions is posted on the site related to the content while the content is watched.

9. The electronic device according to claim 6, wherein
the chapter making section has a classification association method selection section that enables the selection of the following options:
to associate the chapter with the classification based on all the contributions related to the period of the chapter in the site, or
to associate the chapter with the classification based on the contributions of the specified contributors during the period of the chapter in the site.

10. The electronic device according to claim 6, wherein
the chapter making section has a chapter making method selection section that enables the selection of the following options:
to specify the chapter to the contents recorded in the recording section based on the hourly fluctuation of the number of the contributions calculated by adding a same weight to all contributions, or
to specify the chapter to the contents recorded in the recording section based on the hourly fluctuation of the number of the contributions calculated by adding heavier weight to the contributions of the specified contributors than other information.

11. A playback device that plays the content recorded by the electronic device and displays plural contents as a list on a screen according to claim 1, wherein
the playback device displays the contents in association with the classifications of the contents on the screen.

12. A playback device that plays the content recorded by the electronic device and displays the chapter of the content on a screen according to claim 1, wherein
the playback device displays the chapter in association with the classification of the chapter on the screen.

13. A playback device that plays the content recorded by the electronic device and displays the content on a playback screen according to claim 1, wherein
the playback screen has:
a content display area to display the content,
a classification display area to display the classification of the content synchronized with the playback of the content, and
a contribution display area to display the contributions posted when the content is recorded synchronized with the playback of the content.

14. A server device that transfers the contents of broadcasting to a client device, comprising:
a recording section that records a content extracted from the broadcasting,
an acquiring section that acquires posted contributions and posted times of the contributions from a site on a network related to the content during the content is on the air,
a classification section that analyzes and classifies the contributions,
a chapter making section that specifies chapters to the content recorded in the recording section based on hourly fluctuation of a number of the contributions in the site during the content is on the air and associates the chapter with a classification based on the contributions during the period of the chapter, and
a delivering section that delivers the content in which the chapter is specified to a client device in accordance with a request from the client device
the chapter making section specifies the chapter to a period including at least time when a rate of increase of the hourly fluctuation exceeds a predefined amount and time when the hourly fluctuation changes to decrease from increase.

15. The server device according to claim 14, further comprising:
a specified contributor recording section that records specified contributors who contemporary post the contributions of the same classification as the contributions posted by the user of the client device in the site on the network related to the content while the content is playing by the client device, wherein
the chapter making section specifies the chapter to the content based on the hourly fluctuation of the number of the contributions calculated by adding a heavier weight to the contributions of the specified contributors than other information.

* * * * *